United States Patent
Tang et al.

(10) Patent No.: US 8,202,196 B2
(45) Date of Patent: Jun. 19, 2012

(54) CLUTCH ENGAGING CONTROL METHOD AND CONTROL SYSTEM IN HYBRID POWER OUTPUT DEVICE

(75) Inventors: Xiaohua Tang, Shenzhen (CN); Nan Liu, Shenzhen (CN); Jian Gong, Shanghai (CN); Ming Yu, Shanghai (CN); Yingwu Xu, Shanghai (CN); Kai Liu, Shenzhen (CN); Xianhong Jiang, Shenzhen (CN); Qiaoqiao Wu, Shenzhen (CN)

(73) Assignee: BYD Co. Ltd., Shenzhen (CN)

( * ) Notice: Subject to any disclaimer, the term of this patent is extended or adjusted under 35 U.S.C. 154(b) by 347 days.

(21) Appl. No.: 12/670,499

(22) PCT Filed: May 22, 2008

(86) PCT No.: PCT/CN2008/071049
§ 371 (c)(1),
(2), (4) Date: Jan. 25, 2010

(87) PCT Pub. No.: WO2009/012671
PCT Pub. Date: Jan. 29, 2009

(65) Prior Publication Data
US 2010/0210411 A1 Aug. 19, 2010

(30) Foreign Application Priority Data
Jul. 25, 2007 (CN) .......................... 2007 1 0129745

(51) Int. Cl.
*B60W 10/08* (2006.01)
(52) U.S. Cl. ............................................. 477/5
(58) Field of Classification Search .......... 477/5, 6
See application file for complete search history.

(56) References Cited

U.S. PATENT DOCUMENTS

| | | | |
|---|---|---|---|
| 6,166,499 | A | 12/2000 | Kanamori et al. |
| 6,190,282 | B1 | 2/2001 | Deguchi et al. |

(Continued)

FOREIGN PATENT DOCUMENTS

CN 1915702 2/2007
(Continued)

OTHER PUBLICATIONS

International Search Report dated Jul. 17, 2008, issued in related PCT Publication No. PCT/CN2008/071049.

*Primary Examiner* — Dirk Wright
(74) *Attorney, Agent, or Firm* — Brinks Hofer Gilson & Lione

(57) ABSTRACT

The present invention provides a clutch engaging control method in a hybrid power output device, wherein the device comprises an engine, a first motor, a clutch and a second motor that are connected in sequence, a battery, and a speed reducing mechanism and a drive shaft that are connected to the output end of the second motor; the method comprises: (a) detecting the rotation speed $\omega_2$ of the second motor and setting the rotation speed $\omega_2$ as the target rotation speed $\omega_0$ of the first motor, when the vehicle is driven by the second motor and the engine is required to be started to provide assistance to the second motor; (b) starting the first motor to drive the engine, and controlling the actual rotation speed $\omega_1$ of the first motor to be close to the target rotation speed $\omega_0$; (c) switching the state of the first motor from a driving motor to a power generator when the actual rotation speed $\omega_1$ of the first motor is approximately equal to the target rotation speed $\omega_0$; and (d) engaging the clutch. The method can improve the dynamic response time of the engine and suppress impact in the clutch engaging process. The present invention further provides a clutch engaging control system in a hybrid power output device.

10 Claims, 3 Drawing Sheets

U.S. PATENT DOCUMENTS

| | | |
|---|---|---|
| 7,117,963 B2 | 10/2006 | Saito et al. |
| 2004/0065490 A1 | 4/2004 | Saito et al. |
| 2005/0038577 A1 | 2/2005 | Dreibholz et al. |
| 2010/0181125 A1* | 7/2010 | Wang et al. ............... 180/65.22 |
| 2010/0282530 A1* | 11/2010 | Wang et al. ............... 180/65.22 |

FOREIGN PATENT DOCUMENTS

| | | |
|---|---|---|
| DE | 69801854 | 4/2002 |
| DE | 10337002 | 3/2005 |
| EP | 0866544 A2 | 9/1998 |
| JP | 10271749 | 10/1998 |
| JP | 11165566 | 6/1999 |
| JP | 3000953 | 11/1999 |
| JP | 3341659 | 8/2002 |
| JP | 2004129411 | 4/2004 |
| JP | 2005065492 | 3/2005 |
| JP | 2007001573 | 1/2007 |
| JP | 3964446 | 6/2007 |

* cited by examiner

US 8,202,196 B2

CLUTCH ENGAGING CONTROL METHOD AND CONTROL SYSTEM IN HYBRID POWER OUTPUT DEVICE

CROSS-REFERENCE TO RELATED APPLICATIONS

This application is a national phase application of PCT Application No. PCT/CN2008/071049, filed May 22, 2008, which claims priority from Chinese Patent Application No. 2007-10129745.8, filed Jul. 25, 2007, both contents of which are incorporated herein by reference in their entirety.

TECHNICAL FIELD

The present invention relates to a clutch engaging control method in a hybrid power output device, which can improve engine response rate and suppress impact in the clutch engaging process. The present invention further relates to a clutch engaging control system in a hybrid power output device.

BACKGROUND

FIG. 1 shows the structure of a typical hybrid power output device. As shown in FIG. 1, the device comprises an engine 1, a first motor (MG1) 2, a clutch 4 and a second motor (MG2) 3 that are connected in sequence, a battery 5 electrically connected to the first motor 2 and the second motor 3, and a speed reducing mechanism (e.g., a fixed-ratio speed reducing mechanism or a variable-ratio speed reducing mechanism) 8 and a drive shaft 9 that are connected to the output end of the second motor 3. When the vehicle is driven or propelled only by the second motor 3, if the power requirement of the vehicle still can't be met, the clutch 4 must be engaged to output the power of the engine 1 so as to provide assistance.

In a conventional control method, in order to attain the condition for clutch engaging, in the process that the rotation speed of the engine is regulated solely by the engine itself, it will take a long time to attain the target rotation speed because the rotation speed control by the engine itself is lagged; in addition, severe over-control may occur in the process, i.e., oscillation of rotation speed near the ideal rotation speed for clutch engaging will occur, which will have some adverse effect to the driving comfort. During the process the engine speed increases, if the clutch is engaged when the target rotation speed is just attained but the rotation speed is still in the oscillation period, the huge impact may cause damage to the clutch even though the system response time can be shortened to a certain degree; however, if the clutch is engaged after the rotation speed of the engine is self-regulated, the dynamic system response time will be increased, i.e., a long time is required.

SUMMARY OF THE INVENTION

An object of the present invention is to provide a clutch engaging control method in a hybrid power output device, which can improve engine response time and suppress impact in the clutch engaging process.

In one aspect, the present invention provides a clutch engaging control method in a hybrid power output device, wherein the device comprises an engine, a first motor, a clutch and a second motor that are connected in sequence, a battery electrically connected to the first motor and the second motor, and a speed reducing mechanism and a drive shaft that are connected to the output end of the second motor; the method comprises the following steps:

(a) detecting the rotation speed $\omega_2$ of the second motor and setting the rotation speed $\omega_2$ as the target rotation speed $\omega_0$ of the first motor, when the vehicle is driven by the second motor and the engine is required to be started to provide assistance to the second motor;

(b) starting the first motor to drive the engine, and controlling the actual rotation speed $\omega_1$ of the first motor to be close to the target rotation speed $\omega_0$ of the first motor;

(c) switching the state of the first motor from a driving motor to a power generator to provide load to the engine and thereby stabilize the rotation speed of the engine, when the actual rotation speed $\omega_1$ of the first motor is approximately equal to the target rotation speed $\omega_0$ of the first motor;

(d) engaging the clutch.

In the above method, when the clutch is to be engaged to enable the engine to provide assistance for driving, the first motor can drive the engine to reach to the target rotation speed quickly because the engine is in unloaded state. Then, by changing the first motor into a generator to provide certain load to the engine, the rotation speed of the engine can be stabilized, and speed over-control of the engine (i.e., the engine speed exceeds the target rotation speed) can be prevented. Next, the clutch can be engaged quickly. Therefore, the method can improve the dynamic response time of the engine and suppress impact in the clutch engaging process.

In another aspect, the present invention provides a clutch engaging control system in a hybrid power output device, wherein the hybrid power output device comprises an engine, a first motor, a clutch and a second motor that are connected in sequence, a battery electrically connected to the first motor and the second motor, and a speed reducing mechanism and a drive shaft that are connected to the output end of the second motor; the system further comprises a speed transducer and a controller, wherein the speed transducer is designed to detect the rotation speed $\omega_2$ of the second motor and send the signal of rotation speed to the controller when the vehicle is driven by the second motor and the engine is required to be started to provide assistance to the second motor; the controller is designed to set the rotation speed $\omega_2$ as the target rotation speed $\omega_0$ of the first motor according to the signal and control the first motor to start and drive the engine, so as to control the actual rotation speed $\omega_1$ of the first motor to be close to the target rotation speed $\omega_0$ of the first motor; the controller is further designed to switch the state of the first motor from a driving motor to a power generator to provide load to the engine to stabilize the rotation speed of the engine and control the clutch to engage when the actual rotation speed $\omega_1$ of the first motor is approximately equal to the target rotation speed $\omega_0$ of the first motor.

DETAILED DESCRIPTION OF CERTAIN INVENTIVE EMBODIMENTS

Hereunder the present invention will be described in detail, with reference to the accompanying drawings.

Figure 1:
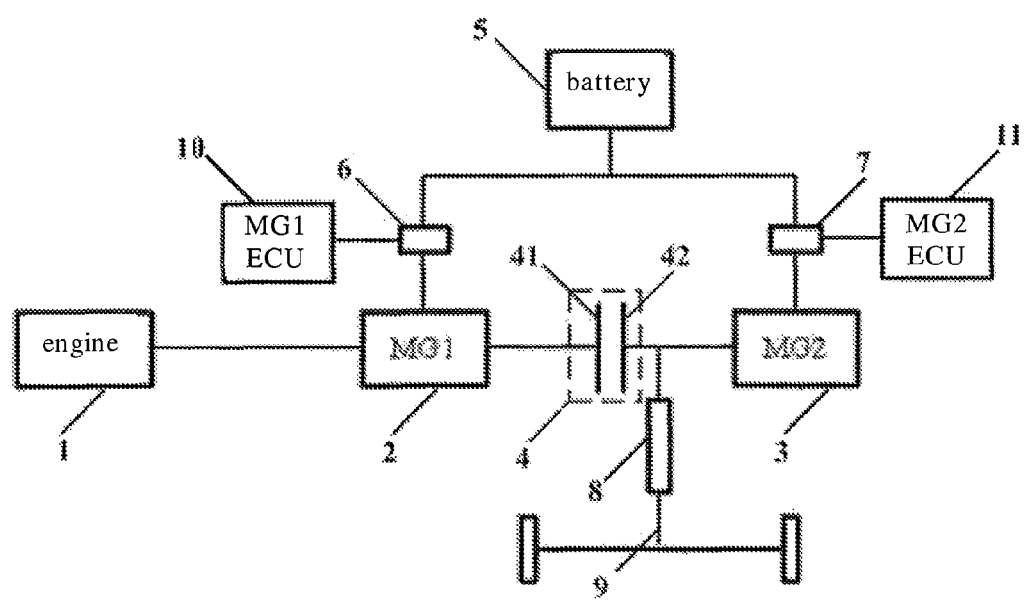
FIG. 1 is a schematic diagram of a typical hybrid power output device.

FIG. 1 is a structural view of a typical hybrid power output device. In that device, the output shaft of an engine 1 is connected (preferably connected coaxially) to a first motor (MG1) 2. The first motor 2 is connected to a second motor 3 via a clutch 4. The first motor 2 and the second motor 3 are electrically connected to a battery 5 via power converters 6 and 7 respectively. The first motor 2 can convert the mechanical power output from the engine 1 into electric power and store the electric power in the battery 5. The battery 5 can provide electric power to the second motor 3 to drive the vehicle to run, and also can provide electric power to the first motor 2 when the first motor 2 functions as a driving motor. The first power converter 6 and the second power converter 7 can carry out bidirectional power conversion between the battery 5 and the first motor 2 and between the battery 5 and the second motor 3. The second motor 3 is connected to a drive shaft 9 via a fixed-ratio speed reducing mechanism or a variable-ratio speed reducing mechanism 8. A second motor controller (an ECU that controls MG2) 11 controls the power output from the second motor 3 by controlling the second power converter 7 according to the current gear position, throttle, and brake information, and requests the first motor 2 to start or stop the engine 1 according to the power storage in the battery 5. A first motor controller (an ECU that controls MG1) 10 can start or stop the engine 1 under instruction of the second motor controller 11, and can switch the first motor 2 to be a driving motor as required during power switching.

The first motor 2 can convert the mechanical power output from the engine 1 into electric power and store the electric power in the battery 5 when the hybrid power output device is in purely serially connected state. The second motor 3 provides power output to the entire vehicle, and it is powered by the battery 5. When the hybrid power output device is in purely serially connected state, the power output from the engine 1 is only converted by the first motor 2 into electric power and stored in the battery 5. If the power output from the second motor 3 is not sufficient to meet the power requirement of the entire vehicle and thereby the clutch 4 must be engaged, the engine 1 will provide power to the drive shaft 9; if the engine has redundant power output, it can charge the battery 5 via the first motor 2 while it provides power to the drive shaft 9.

Figure 2:
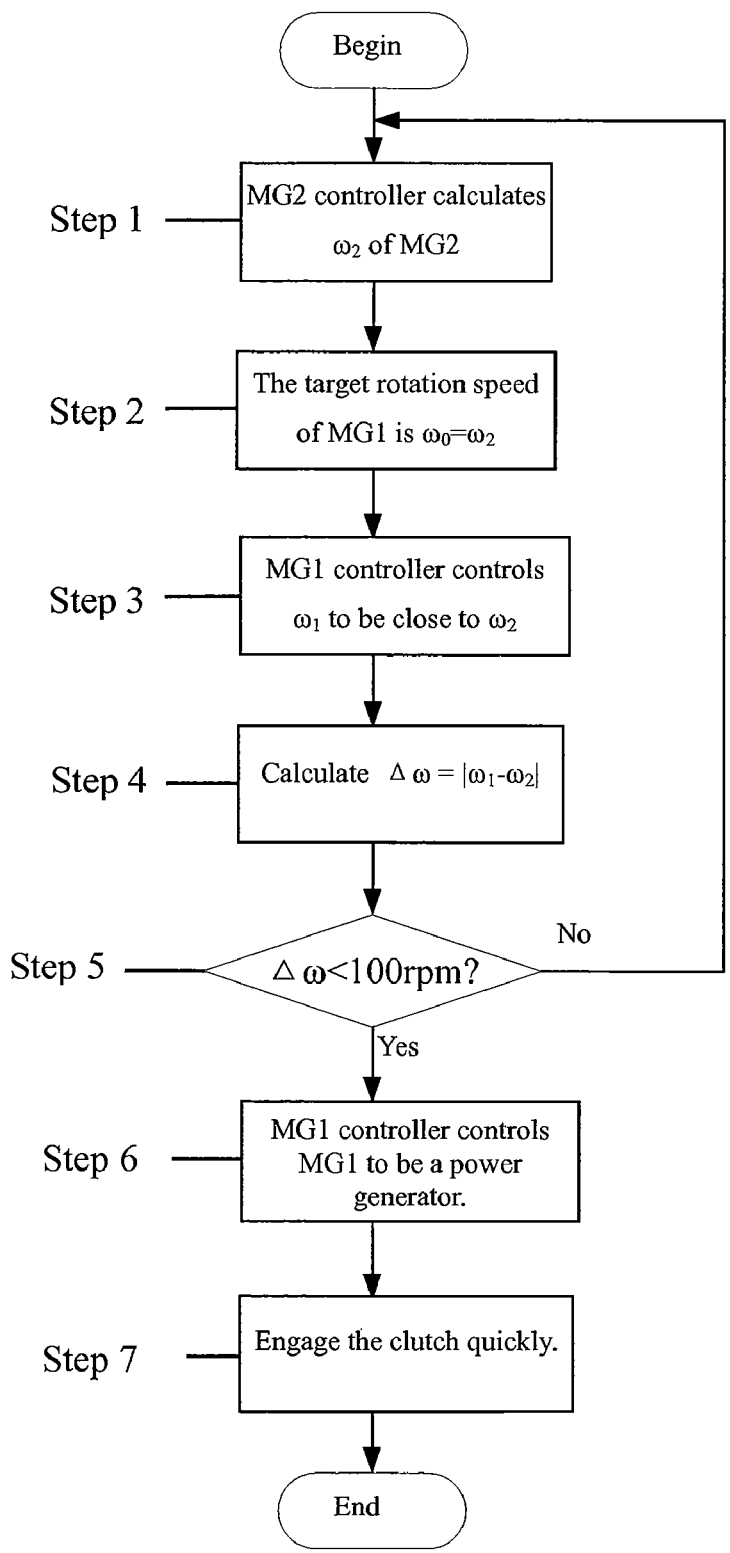
FIG. 2 is a flow diagram of a typical control method provided in the present invention.

FIG. 2 is a flow diagram of a typical control method provided in the present invention. Hereunder the control method will be described with reference to FIG. 2.

Step 1: the second motor controller 11 first calculates the power demand of the entire vehicle according to the signals, and then determines whether to engage the clutch 4 so that the power output from the engine 1 can be used directly to drive the vehicle according to the power demand of the entire vehicle. When the power from the engine 1 is required, the second motor controller 11 will detect the rotation speed $\omega_2$ of the second motor 3 in real time. For example, a rotary transformer can be mounted on the second motor 3 to detect the position of the rotor in real time, and then the current rotation speed $\omega_2$ of the motor rotor can be calculated according to the position of the rotator and the sampling interval, and thereby the current acceleration $a_2$ of the rotator can be calculated from the rotation speed (the acceleration can be used in the following embodiment).

Step 2: send the actual rotation speed $\omega_2$ of the second motor 3 to the first motor controller 10. The first motor controller 10 sets the actual rotation speed $\omega_2$ of the second motor 3 as the target rotation speed $\omega_0$ of the first motor 2.

Step 3: the battery 5 supplies electric power to the first motor 2, so that the first motor 2 functions as a driving motor. The first motor controller 10 controls the actual rotation speed $\omega_1$ of the first motor 2 to be close to the given target rotation speed $\omega_0$ via the power converter 6. In that process, since the engine 1 is free of load, the actual rotation speed $\omega_1$ of the first motor 2 can increase quickly when the first motor 2 drives the engine 1.

Step 4: the first motor controller 10 calculates the actual rotation speed $\omega_1$ of the first motor 2, and compares the actual rotation speed $\omega_1$ with the target rotation speed $\omega_0$ (=$\omega$2) to obtain the speed difference $\Delta\omega$, i.e., $\Delta\omega = |\omega_1 - \omega_0|$.

Step 5: when the speed difference $\Delta\omega$ is in the preset range (i.e., the actual rotation speed $\omega_1$ of the first motor is approximately equal to the target rotation speed $\omega_0$ of the first motor), e.g., 50-200 rpm, preferably <100 rpm (in this embodiment, it is 100 rpm, and the value can be set according to the condition of the entire vehicle, there is no limitation to it in the present invention), i.e., $\Delta\omega$<100 rpm, it is deemed that the condition of speed for engaging the clutch 4 is met. If the condition is not met, the above steps would be repeated from step 1.

Step 6: the first motor controller 10 switches the running state of the first motor 2 from a driving motor to a power generator, to absorb the output torque of the engine 1 and generate power to charge the battery 5. Now, since the first motor 2 functions as a power generator, it provides load to the engine 1 and thereby can keep the rotation speed of the engine 1 stable, without speed over-control or oscillation near the target rotation speed.

Step 7: when the first motor 2 functions as a power generator and the rotation speed of the engine 1 is kept stable, the clutch 4 is engaged quickly.

In that way, the clutch can be engaged quickly; in addition, since the speed difference between both sides of the clutch is very small, i.e., the speed difference between the first motor and the second motor is very small, the impact can be suppressed effectively during the clutch engaging process.

Figure 3:
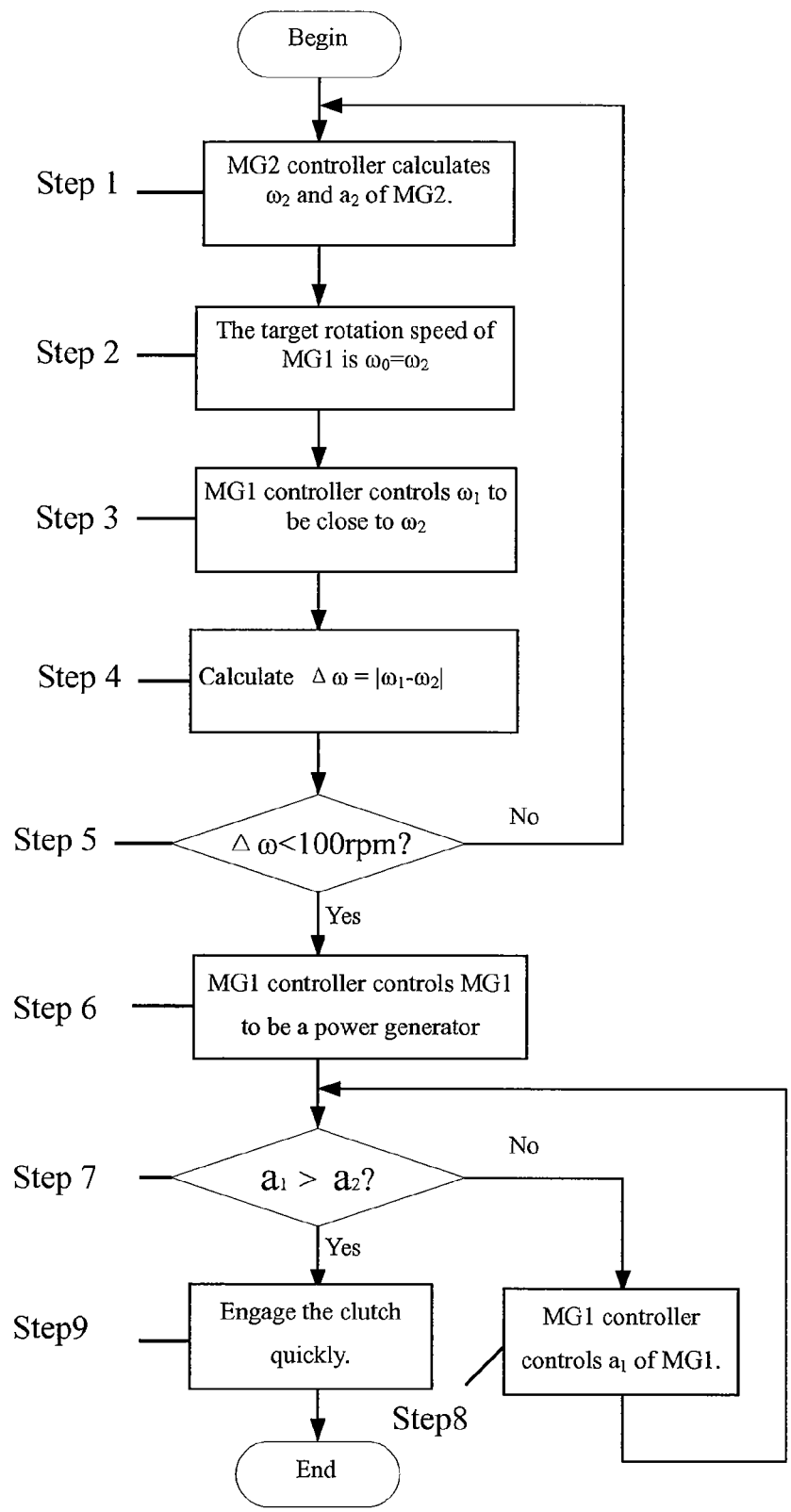
FIG. 3 is a flow diagram of a preferred control method provided in the present invention.

FIG. 3 is a flow diagram of a preferred control method provided in the present invention. Compared to the control method shown in FIG. 2, this control method further comprises the step of controlling the acceleration of the first motor. Due to the fact that there is a period of time between the time the acceleration of the second motor is acquired and the time the clutch is engaged, i.e., both the speed regulation of the first motor and the clutch engagement require a period of time, the speed of the second motor can increase further during that period; therefore, the impact during the clutch engaging process can be minimized by keeping the acceleration of the first motor slightly higher than the acceleration of the second motor.

Hereunder the control method will be described with reference to FIG. 3; wherein the common content in the two drawings will be omitted or only described in brief.

Step 1: the second motor controller 11 acquires or calculates the rotation speed $\omega_2$ and acceleration $a_2$ of the second motor 3 in real time.

Step 2: the first motor controller takes the actual rotation speed $\omega_2$ of the second motor as the target rotation speed $\omega_0$ of the first motor.

Step 3: the first motor controller controls the actual rotation speed $\omega_1$ of the first motor to be close to the target rotation speed $\omega_0$.

Step 4: the first motor controller 10 calculates the actual rotation speed $\omega_1$ of the first motor 2, and compares the actual rotation speed $\omega_1$ with the target rotation speed $\omega_0$ (=$\omega$2) to obtain the speed difference $\Delta\omega$.

Step 5: when the speed difference $\Delta\omega$ is within the preset range, it is deemed that the condition of speed for engaging the clutch 4 is met. If the condition is not met, the above steps are repeated from step 1.

Step 6: the first motor controller switches the first motor from a driving motor to a power generator.

Step 7: the acceleration $a_1$ of the first motor calculated by the first motor controller is compared with the acceleration $a_2$ of the second motor determined in step 1, to control the acceleration $a_1$ of the first motor to be slightly higher than the acceleration $a_2$ of the second motor, i.e., a1>a2. For example, the acceleration $a_1$ of the first motor can be higher than the acceleration $a_2$ of the second motor by 10~200 rpm/min.

Step 8: if the acceleration condition is not met, the first motor controller will adjust the power generation load to regulate the acceleration $a_1$ of the first motor, and then compares the two acceleration values, till the acceleration condition is met.

Step 9: if the acceleration condition for engaging the clutch is met, the rotation speeds at both sides 41 and 42 of the clutch 4 will be approximately equal to each other, and the rotator acceleration of the first motor will be slightly higher than the rotator acceleration of the second motor; then, the clutch 4 can be engaged quickly and the impact to the vehicle can be minimized, so that the power output from the engine is supplied to the drive shaft.

In an embodiment of the present invention, a clutch engaging control system in a hybrid power output device is provided, wherein the hybrid power output device comprises an engine 1, a first motor 2, a clutch 4 and a second motor 3 that are connected in sequence, a battery 5 electrically connected to the first motor 2 and the second motor 3, and a speed reducing mechanism 8 and a drive shaft 9 that are connected to the output end of the second motor; the system further comprises a speed transducer and a controller, wherein the speed transducer is designed to detect the rotation speed $\omega_2$ of the second motor and send the detected signal to the controller when the vehicle is driven by the second motor and the engine is required to be started to provide assistance to the second motor; the controller is designed to set the rotation speed $\omega_2$ as the target rotation speed $\omega_0$ of the first motor according to the signal and control the first motor to start and drive the engine, so as to control the actual rotation speed $\omega_1$ of the first motor to be close to the target rotation speed $\omega_0$ of the first motor; the controller is further designed to switch the state of the first motor from a driving motor to a power generator to provide load to the engine and stabilize the rotation speed of the engine and control the clutch to engage when the actual rotation speed $\omega_1$ of the first motor is approximately equal to the target rotation speed $\omega_0$ of the first motor.

As an example, the actual rotation speed $\omega_1$ of the first motor is approximately equal to the target rotation speed $\omega_0$ of the first motor can be defined that the difference between the actual rotation speed $\omega_1$ of the first motor and the target rotation speed $\omega_0$ of the first motor is smaller than 200 rpm, preferably smaller than 100 rpm.

In addition, the controller can calculate the acceleration $a_2$ of the second motor from the rotation speed $\omega_2$ of the second motor, and set the acceleration $a_2$ as the target acceleration $a_0$ of the first motor. When the actual rotation speed $\omega_1$ of the first motor is approximately equal to the target rotation speed $\omega_0$ of the first motor, the controller controls the first motor to switch from the driving motor to the power generator so as to provide load to the engine and thereby stabilize the rotation speed of the engine, controls the load of the first motor to regulate the actual acceleration $a_1$ of the first motor to be slightly higher than the target acceleration $a_0$, and then controls the clutch to engage.

Preferably, the actual acceleration $a_1$ may be higher than the target acceleration $a_0$ by 10~200 rpm/min.

While the present invention has been illustrated and described with reference to some embodiments, the present invention is not limited to these. For example, the control method provided in the present invention can be applied to other similar hybrid power output devices, or some modifications or embellishments can be made to the control method and the control system provided in the present invention, without departing from the spirit and scope of the present invention; however, such modifications or embellishments shall fall into the protected domain of the present invention.

The invention claimed is:

1. A clutch engaging control system in a hybrid power output device,
   the power output device comprising:
      an engine;
      a first motor;
      a second motor operatively coupled to the first motor by a clutch;
      a battery electrically connected to the first motor and the second motor;
      a speed reducing mechanism connected to an output of the second motor;
      a drive shaft connected to an output of speed reducing mechanism;
   the clutch engaging control system comprising:
      a speed transducer configured to determine a rotational speed $\omega_2$ of the second motor and provide a rotational speed signal;
      a controller configured receive the rotational speed signal from the speed transducer;
      when power output from the engine is needed in addition to power output from the second motor, the controller is configured to:
         set the rotational speed of the second motor $\omega_2$ as a target rotational speed $\omega_0$ of the first motor, and control the first motor to start the engine and drive the engine such that an actual rotational speed $\omega_1$ of the first motor approximates the target rotational speed $\omega_0$ of the first motor;
         control the first motor to switch from a driving motor mode to a power generation mode to load the engine to stabilize the rotational speed of the engine; and
         control the clutch to engage when the actual rotational speed $\omega_1$ of the first motor approximates the target rotational speed $\omega_0$ of the first motor.

2. The control system according to claim 1, wherein the actual rotational speed $\omega_1$ of the first motor approximates the target rotational speed $\omega_0$ of the first motor when a difference therebetween is less than 200 rpm.

3. The control system according to claim 1, wherein the controller is configured to:
   calculate an acceleration $a_2$ of the second motor based on the rotational speed $\omega_2$ of the second motor, and set the acceleration $a_2$ as a target acceleration $a_0$ of the first motor;
   when the actual rotational speed $\omega_1$ of the first motor approximates the target rotational speed $\omega_0$ of the first motor, control the first motor to switch from the driving motor mode to the power generation mode to load the engine to stabilize the rotational speed of the engine; and
   control a load of the first motor to regulate the actual acceleration $a_1$ of the first motor to be slightly greater than the target acceleration $a_0$, and then control the clutch to engage.

4. The control system according to claim 1, wherein the actual acceleration $a_1$ is greater than the target acceleration $a_0$ by 10 rpm/min to 200 rpm/min.

5. The control system according to claim 1, wherein the speed reducing mechanism is a fixed-ratio speed reducing mechanism.

6. A clutch engaging control method in a hybrid power output device, wherein the power output device comprises:
- an engine;
- a first motor;
- a second motor operatively coupled to the first motor by a clutch;
- a battery electrically connected to the first motor and the second motor;
- a speed reducing mechanism connected to an output of the second motor; and
- a drive shaft connected to an output of the speed reducing mechanism;

the clutch engaging method comprising the steps of:
when power output from the engine is needed in addition to power output from the second motor:
- (a) determining a rotational speed $\omega_2$ of the second motor and setting the rotational speed $\omega_2$ as a target rotational speed $\omega_0$ of the first motor;
- (b) controlling the first motor to start the engine, and controlling an actual rotational speed $\omega_1$ of the first motor to approximate the target rotational speed $\omega_0$ of the first motor;
- (c) switching a mode of the first motor from the driving motor mode to the power generator mode to load the engine to stabilize the rotational speed of the engine; and
- (d) engaging the clutch when the actual rotational speed $\omega_1$ of the first motor approximates the target rotational speed $\omega_0$ of the first motor.

7. The control method according to claim 6, wherein the actual rotational speed $\omega_1$ of the first motor approximates the target rotational speed $\omega_0$ of the first motor when a difference therebetween is less than 200 rpm.

8. The control method according to claim 6, further comprising:
in step (a), an acceleration $a_2$ of the second motor is determined, and is set as a target acceleration $a_0$ of the first motor; and
prior to step (d), regulating an actual acceleration $a_1$ of the first motor by controlling the load of the first motor so that the actual acceleration $a_1$ is greater than the target acceleration $a_0$ by a predetermined amount.

9. The control method according to claim 8, wherein the actual acceleration $a_1$ is greater than the target acceleration $a_0$ by 10 rpm/min to 200 rpm/min.

10. The control method according to claim 6, wherein the speed reducing mechanism is a fixed-ratio speed reducing mechanism.

* * * * *